United States Patent
Anders

[15] 3,696,913
[45] Oct. 10, 1972

[54] EXTRUDER WORMS FOR EXTRUDING SYNTHETIC RESINS

[72] Inventor: Dietmar Anders, Hannover, Germany

[73] Assignee: Hermann Berstorff Maschinenbau GmbH, Hannover-Kleefeld, Germany

[22] Filed: April 3, 1970

[21] Appl. No.: 25,458

[30] Foreign Application Priority Data

April 19, 1969    Germany ............G 69 15 822

[52] U.S. Cl. ................198/213, 18/12 SM, 287/2, 416/176, 416/244
[51] Int. Cl. ..............................................B65g 33/00
[58] Field of Search.18/12 SM, 12 SC, 12 SR, 12 SS, 18/12 SZ, 30 SM, 30 SQ, 30 SP, 30 SR; 287/2, 108, 53; 416/176, 244; 198/213

[56] References Cited

UNITED STATES PATENTS

| 2,946,089 | 7/1960 | Heston..................18/12 SM |
|---|---|---|
| R23,839 | 6/1954 | Magerkurth et al.....18/12 SM |
| 2,705,343 | 4/1955 | Hendry..............18/12 SR UX |
| 3,278,986 | 10/1966 | Welt.........................18/12 SR |
| 3,509,601 | 5/1970 | Johansson............18/12 SA X |
| 2,239,192 | 4/1941 | Cutting....................287/53 SS |
| 2,404,145 | 7/1946 | Schweickart..................287/2 |

OTHER PUBLICATIONS

Modern Pastics, Oct. 1966, page 54; Sectionalized Extruder Screws Use Splined Connections.

Primary Examiner—J. Spencer Overholser
Assistant Examiner—Michael O. Sutton
Attorney—Mason, Mason & Albright

[57] ABSTRACT

An extruder worm comprises a plurality of co-axial hollow worm sections keyed to a shaft extending therethrough. The sections are urged together by a disc spring.

1 Claim, 2 Drawing Figures

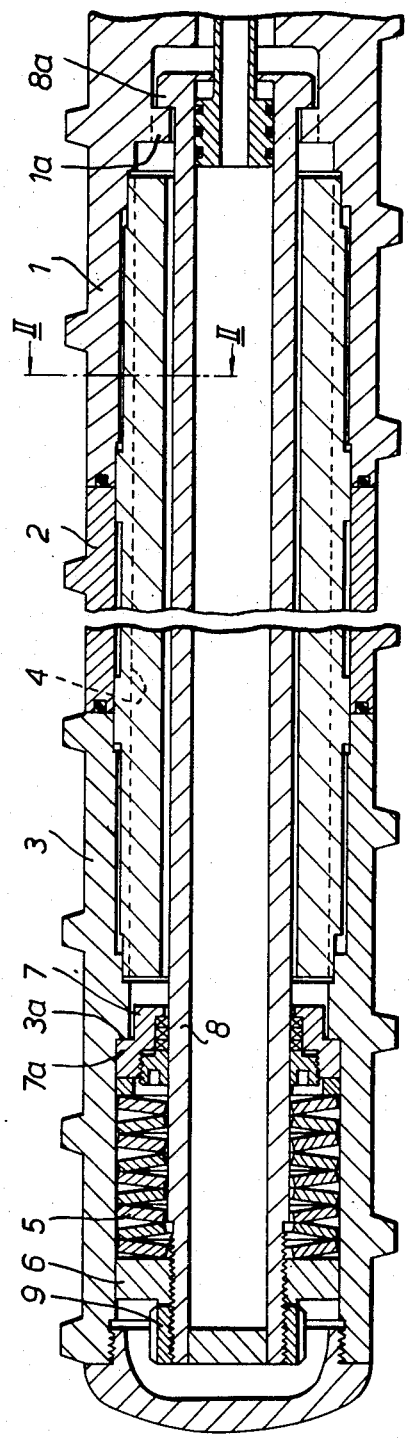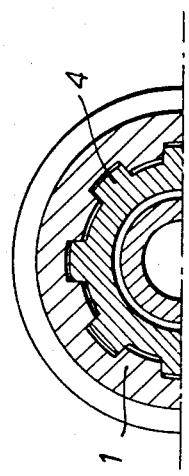

EXTRUDER WORMS FOR EXTRUDING SYNTHETIC RESINS

BACKGROUND OF THE INVENTION

1 Field Of The Invention

The present invention relates to a divided extruder worm

2 Description Of The Prior Art

In one form of worm proposed hitherto, the worm comprises a plurality of hollow sections threadedly connected. This worm has proved unsatisfactory, since torque transmission gives rise to considerable tensile forces, which frequently cause damage to the screw-thread. In addition to this, a series of centering operations are involved during the assembly of the worm.

SUMMARY OF THE INVENTION

According to the invention there is provided an extruder worm comprising a plurality of co-axial hollow worm sections, and a spindle, said spindle extending through said worm sections and being keyed thereto.

Further according to the invention there is provided an extruder worm comprising a plurality of co-axial hollow worm sections, each said section having a plurality of splines extending axially along its inner surface, a hollow spindle having a plurality of splines extending axially along its outer surface, said spindle extending through said worm sections, and the splines on said worm sections being operatively associated with the splines on said spindle, a tie rod extending through said spindle, first abutment means on one of said sections at one end portion of said worm, second abutment means on said tie rod, and a disc spring interposed between said first and second abutment means

BRIEF DESCRIPTION OF THE DRAWINGS

An embodiment of the invention will now be described by way of example only with reference to the accompanying diagrammatic drawing, in which:

FIG. 1 is a fragmentary longitudinal section through a worm in accordance with the invention, and FIG. 2 is a fragmentary section taken on line II—II of FIG. 1.

DESCRIPTION OF THE PREFERRED EMBODIMENT

For illustrative purposes only, there is shown in the drawing a worm consisting of three worm sections, 1, 2 and 3. The invention is not restricted to this case, however, but can also be advantageously applied to a worm consisting of two worm sections or to a worm consisting of four or more worm sections.

As can be seen from FIG. 2 in particular, the worm sections 1 to 3 are co-axial and are in the form of hollow keyed hubs, through which extends a splined spindle 4, which is hollow in the embodiment illustrated.

The adjacent sections 1 to 3 of the worm are urged together by a disc spring 5, for example in the form of a plurality of belleville washers, which is interposed between seats 6 and 7. As the drawing clearly shows, the disc spring 5 is mounted within the end section 3 of the worm.

Extending through the spindle 4 is a hollow tie rod 8, which can be connected to and disconnected from the worm section 1 by means of a bayonet-type fixing 1a/8a.

The seat 7 is arranged to act on the worm section 3 and for this purpose, the seat 7 includes a collar 7a, which bears against a shoulder 3a, on the worm section 3.

The seat 6 is mounted for slidable movement along the forward end portion of the tie rod 8, and can be locked in a selected position along the rod 8 by means of a nut 9, which is threaded on the forward end portion of the rod 8.

By rotating the nut 9, the bias of the disc spring 5, and hence the force urging the worm sections 1 to 3 together, can be adjusted. Advantageously the spring 5 can immediately take up any alterations in the length of the worm due to temperature changes.

The worm described hereinbefore is able to transmit relatively high torques. Also an even pressure is applied to the contiguous faces of the worm sections, and is not affected by any variations in the length of the sections due to changes of temperature. The worm can be readily assembled and disassembled.

I claim:

1. An extruder worm comprising
    a plurality of co-axial hollow worm sections, the inner surface of each said section being cylindrical and having a plurality of splines extending axially therealong,
    a hollow spindle, the outer surface of the spindle being cylindrical and having a plurality of splines extending axially therealong, said spindle extending through each said worm section, and the splines on said worm sections being engaged with the splines on said spindle,
    a hollow tie rod extending through said spindle, the inner surface of the spindle being radially spaced from the outer surface of the rod,
    first abutment means on the endmost of said sections at one end portion of said worm, the tie rod engaging the endmost of said sections at the other end portion of the worm,
    second abutment means on said tie rod, and
    spring means mounted on the tie rod and interposed between said first and second abutment means and creating an axial force between the worm sections in a sense to urge the sections relatively together.

* * * * *